T. C. McCLELLAND.
FITTING FOR JOINING UP ELECTRICAL CONDUITS.
APPLICATION FILED JUNE 27, 1917.
1,295,776.
Patented Feb. 25, 1919.
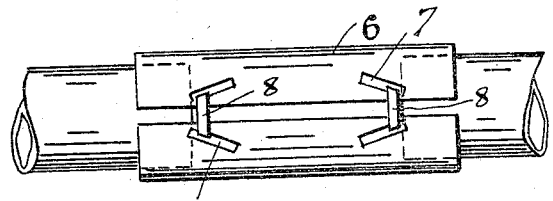
Fig. 1
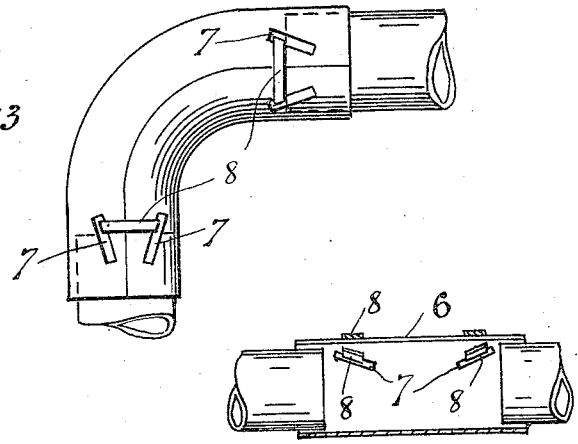
Fig. 3
Fig. 2
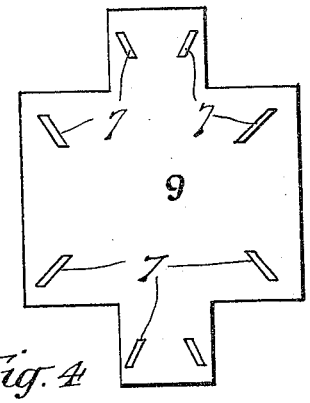
Fig. 4
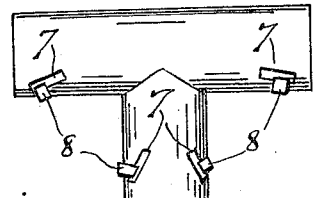
Fig. 5
T. C. McClelland,
Inventor
By ____ Attorney

UNITED STATES PATENT OFFICE.

THOMAS C. McCLELLAND, OF MALVERN, VICTORIA, AUSTRALIA.

FITTING FOR JOINING UP ELECTRICAL CONDUITS.

1,295,776.  Specification of Letters Patent.  Patented Feb. 25, 1919.

Application filed June 27, 1917. Serial No. 177,243.

*To all whom it may concern:*

Be it known that I, THOMAS CHRISTY MC-CLELLAND, a subject of the King of Great Britain, residing at "Parkview," Inkerman Road, Malvern, Victoria, Australia, have invented certain new and useful Improvements in Fittings for Joining Up Electrical Conduits, of which the following is a specification.

This invention relates to fittings such as couplings, T's, bends or elbows by means of which conduits for protecting electric conductors are connected up. These conduits are in some cases used as earth returns and when this is so, it is important that the joints of the connections used are such that continuity of circuit is assured.

According to this invention, a coupling for electrical conduits is provided that is at once simple in construction and self acting and efficient in operation, whereby when the conduit ends are inserted in the coupling and pushed home the same will be effectively locked therewith and in metallic contact through the coupling.

But in order to fully understand the nature of the said invention reference is made to the accompanying drawing, in which, Figure 1 illustrates the invention in side elevation with the conduit ends inserted in a coupling but not locked therewith.

Fig. 2 is a longitudinal sectional elevation of the same.

Fig. 3 shows an elbow fitted with the invention and the conduit ends pushed home and locked therein.

Fig. 4 is a plan view from the inside of a blank stamped out for the formation of a T coupling, and Fig. 5 shows a T fitted with my invention.

The coupling 6 is provided with a longitudinal incision for its entire length and with short slots or openings 7 which are stamped out in the metal and arranged in pairs, one slot of each pair being upon each side of the incision, and inclining therefrom toward the center of the coupling. Bridging the space between the slots 7 of each pair and preferably closed therein are riding clips or yokes 8, the ends of which enter the slots and are turned over and closed on the coupling as indicated in Fig. 2.

By virtue of the inclination of the slots 7 the distance between which becomes greater toward the center of the coupling, the yokes therein when pressed inwardly will draw the edges of the coupling together, the tube having previously been slightly expanded as shown in Fig. 1 to permit of the introduction of the conduit ends. On the latter being inserted and pushed inward the same will abut on the metal yokes and will push them along the slot until the coupling tightly closes on the conduits, which will now be in direct metallic and electrical connection with each other through the coupling 6 and yokes 8.

Fig. 3 shows an elbow constructed substantially in accordance with this invention and wherein the closure between the parts is complete.

As shown in Figs. 4 and 5, a T-piece may be constructed from a blank such as 9, in which the slots 7 have been made. If such a blank is bent upon a tubular mandril about its broadest part and the narrow ends likewise bent on a mandril at right angles to the first, a T will be formed (see Fig. 5) with an opening running from end to end and through the leg which can be closed through the slots 7 and yokes 8 when conduits are inserted to push the yokes along the slots.

In the construction of fittings of the kind indicated, it is advantageous that the same, when constructed and placed in position, will not need to be manually secured. From the foregoing, it will be evident that by means of this invention, a coupling can be placed on the end of a pipe or conduit and after another pipe has been inserted into its other end and pressed home, thereby pushing the coupling onto and over the first pipe, all three pieces will be securely connected in a selfacting way and to provide a closure giving a satisfactory circuit for electric currents.

Electric conduits are usually covered with lacquer or the like to protect same and this has the effect of insulating, more or less, their surfaces unless the protecting skin is broken when the coupling is joined up. In this invention, metallic contact with uncovered metallic surfaces is established through the raw ends of the conduits abutting upon the metallic yokes 8, which in turn contact with the raw edges of the slots 7, thus constituting a proper electrical circuit through the conduits and joints when the same are used to earth the current.

Having now described my invention what

I claim as new and desire to secure by Letters Patent is:

1. A coupling provided with an opening extending throughout its length and having slots arranged on each side of the opening, and a bridge piece having its ends engaging the slots and extending within the coupling for engagement by the end of a conduit, whereby when a conduit is inserted in the coupling the end of the conduit will move the bridge piece along the slots for closing said opening.

2. A coupling comprising a split tube provided with inclined means arranged at each side of the split, and a member engaging the inclined means and extending within the tube for engagement by a conduit, whereby when a conduit is inserted in the tube its end will engage the member and move the same along the inclined means to bring the two longitudinal edges of the tube together.

3. A coupling comprising a tubular member split longitudinally and having inclined slots arranged at opposite sides of the split, and a bridge piece extending across the split, engaging the walls of the slots and extending within the tubular member for engagement by a conduit, whereby when a conduit is inserted in the coupling its end will engage the bridge piece and move the same along the inclined slots for bringing the longitudinal edges of the tubular member toward each other.

4. A T-shaped coupling comprising a longitudinal split tube provided with a hollow leg having longitudinal splits merging toward the split of the tube, said tube and leg being provided with inclined slots which are arranged at opposite sides of the splits and bridge pieces extending across the splits, engaging the walls of the slots, and extending within the tube and leg for engagement by conduits, whereby when conduits are inserted in the tube and leg and moved toward the center of the coupling, the ends of the conduits will engage said bridge pieces and move the same along the slots for closing said splits.

In testimony whereof I have affixed my signature in presence of a witness.

THOMAS C. McCLELLAND.

Witness:
R. N. NEWTON.